United States Patent [19]

Joo

[11] Patent Number: 5,375,025

[45] Date of Patent: Dec. 20, 1994

[54] METHOD OF MEASURING THE REMAINING TIME OF TAPE IN A TAPE RECORDER

[75] Inventor: Chang-Nam Joo, Seoul, Rep. of Korea

[73] Assignee: SamSung Electronics Co., Ltd., Suwon, Rep. of Korea

[21] Appl. No.: 517,817

[22] Filed: May 2, 1990

[30] Foreign Application Priority Data

May 3, 1989 [KR] Rep. of Korea .................. 1989-5962

[51] Int. Cl.$^5$ ............................................. G11B 17/00
[52] U.S. Cl. ...................................... 360/137; 360/72.1
[58] Field of Search ................... 360/137, 13, 69.92, 360/72.1-72.3, 74.4-74.5, 74.1-74.3, 73.01, 73.06; 242/75.51, 75.52

[56] References Cited

U.S. PATENT DOCUMENTS

| | | | |
|---|---|---|---|
| 4,805,053 | 2/1989 | Yamanaka et al. | 360/137 |
| 4,812,940 | 3/1989 | Takenaga | 360/137 |
| 4,866,547 | 9/1989 | Rodal et al. | 360/137 |
| 4,963,999 | 10/1990 | Utsunomiya et al. | 360/72.3 |
| 4,989,112 | 1/1991 | Hamoda | 360/74.5 |
| 4,996,611 | 2/1991 | Ito | 360/72.3 |

Primary Examiner—A. J. Heinz
Attorney, Agent, or Firm—Robert E. Bushnell

[57] ABSTRACT

A method for correctly measuring the time remaining for a tape running in a tape recorder on the basis of a previously calculated remaining time even when the speed of the tape running in the tape recorder changes or runs at a high speed. The method determines whether or not a present remaining time has been calculated and based on this determination other steps are performed. Other steps include determining the rotation period of a supply reel, determining whether or not the tape is running at a normal speed or whether or not the tape is running in a forward direction, whether the speed of the tape is a high speed or not, subtracting from or adding to the rotation period, a change in rotation period based on the speed and direction of the tape for every rotation of the reel to calculate a new rotation period and calculating a new remaining time by subtracting the new rotation period from or adding the new rotation period to the present remaining time determined in the first mentioned step.

13 Claims, 3 Drawing Sheets

METHOD OF MEASURING THE REMAINING TIME OF TAPE IN A TAPE RECORDER

BACKGROUND OF THE INVENTION

The present invention relates to a method for measuring the remaining time of tape in a tape recorder, and more particularly, to a method for correctly measuring the remaining time of tape even when the tape runs at a high speed or the speed of tape changes.

A known tape recorder exercises a function of displaying the remaining time of running tape continuously when the tape is driven. In the case of DAT(Digital Audio Tape Recorder), for example, the tape runs regularly at a speed of $V_t=8.15$ m/s when driven by a capstan motor at a normal speed. So, when one period is measured with the reel pulse of a supply reel by a microcomputer, the remaining time($R_t$) can be found as a theoretical value according to the following formula.

$$R_t=[(V_tT_s)^2-(2\pi r_o)^2]/4\pi\delta V_t \qquad (1)$$

wherein, $V_t$: Running speed of tape when tape runs at normal speed
$T_s$: One period of supply reel
$\delta$: Thickness of tape
$r_o$: Radius of hub Consequently, when the tape runs at normal speed, the remaining time found according to the above formula(1) is increased or decreased by the timer of a microcomputer.

In the case where the tape is made to run at normal speed by the capstan motor, running speed($V_t$) of the tape is constant and the remaining time can be correctly increased or decreased. In the case where the tape runs at high speed mode, the remaining time cannot be increased or decreased correctly for the reason that it is made to turn around fast by driving the reel motor directly, and running speed of the tape is inconstant depending on the remains of tape wound to the reel.

Thus, conventional DAT causes a problem in that the remaining time cannot be displayed correctly on the display screen in the case of high speed running mode and the remaining time must be calculated again when the tape is shifted to normal speed-running mode from high-speed running mode.

SUMMARY OF THE INVENTION

Therefore, an object of the present invention is to provide a method for correctly measuring the remaining time of running tape on the basis of a previously calculated remaining time even when the tape runs at high speed or changes speed in the tape recorder.

In order to accomplish the above object, the present invention comprises the steps of:

(a) judging whether the present remaining time is calculated;

(b) measuring one rotation period on the part of the supply reel by the microcomputer in the case of normal speed running mode in response to the result of a judgment formed in the above step(a);

(c) finding one new rotation period by subtracting a certain quantity of change in the one rotation period from or adding it to the just previous rotation period according to the running direction after every one rotation period of reel passes away in a condition where the remaining time is calculated in the case of high speed running mode or in the case of speed-changing mode in response to the result of a judgment formed in the above step(a); and (d) recording the new remaining time by subtracting the value corresponding to the one new rotation period from or adding the value corresponding to the one new rotation period to the remaining time of running tape already inputted in the above step(a) according to the direction of running every time tape effects one periodic rotation.

BRIEF DESCRIPTION OF THE DRAWINGS

For a better understanding of the invention and to show how the same may be carried into effect, reference will now be made, by way of example, to the accompanying diagrammatic drawings, in which.

DETAILED DESCRIPTION OF THE INVENTION

Figure 2:
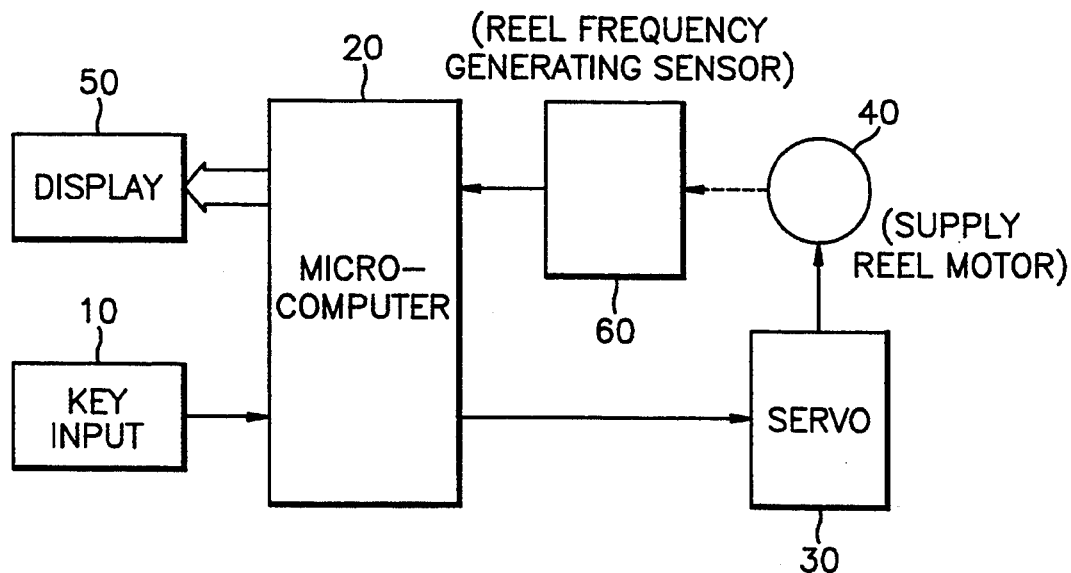
FIG. 2 is a systematic diagram showing only those parts of tape recorder which are correlated to the effectuation of the present invention.

FIG. 2 is a systematic diagram showing a part of a tape recorder necessary to effect the present invention, which comprises: a key input part 10 for generating a key command signal required to drive a running mode designated by a user; a microcomputer 20 for generating a servo control signal according to a corresponding mode by the key command signal and calculating the present remaining time of tape and the period of supply reel by receiving those reel pulses generated in response thereto; a servo 30 for driving a supply reel motor 40 by the servo control signal of the microcomputer 20; a display 50 for displaying the tape remaining time data of the microcomputer 20; and a reel frequency generating sensor 60 for sensing the reel pulse of the supply reel motor 40.

Figure 3A:
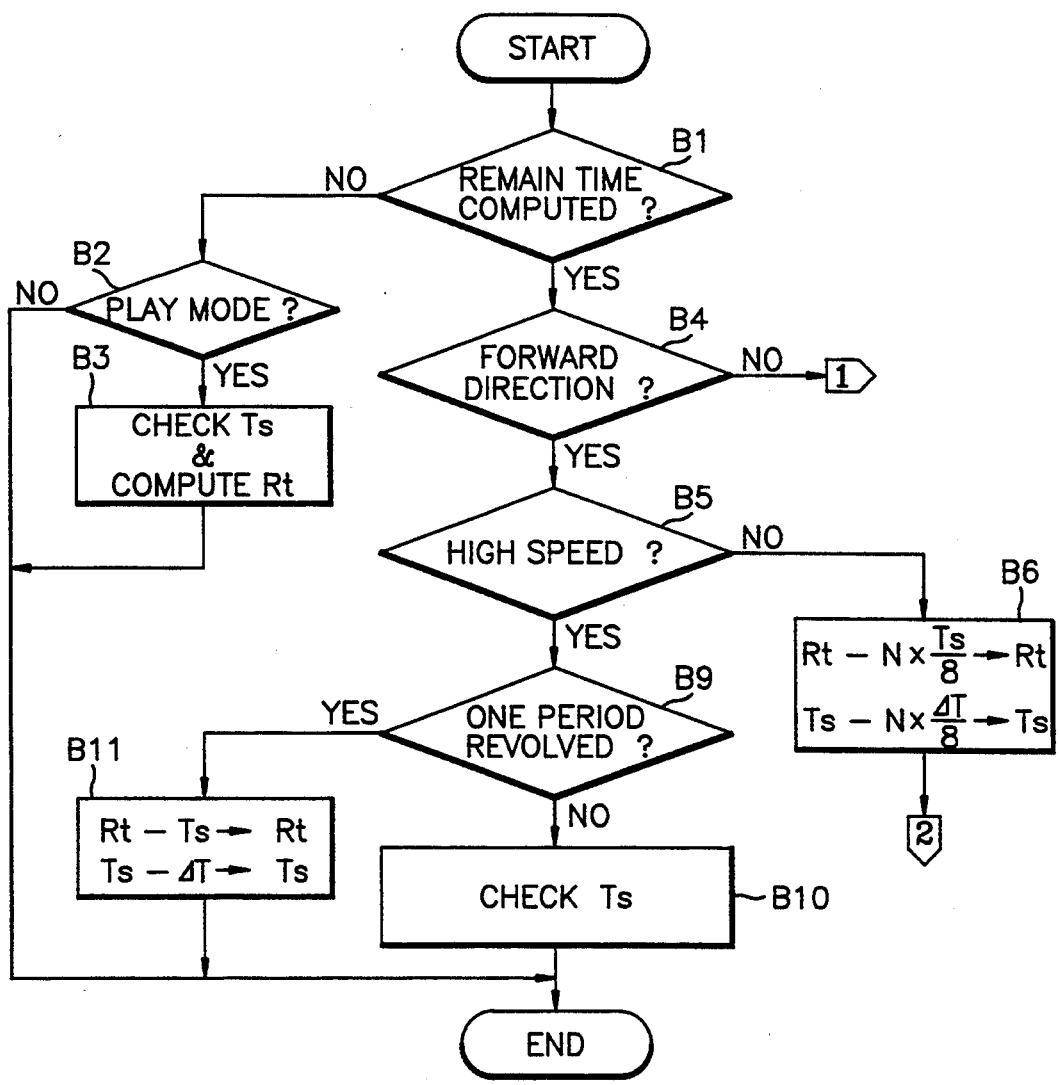
FIGS. 3A and 3B are a flowchart of a method for measuring the remaining time according to the present invention.
Figure 3B:
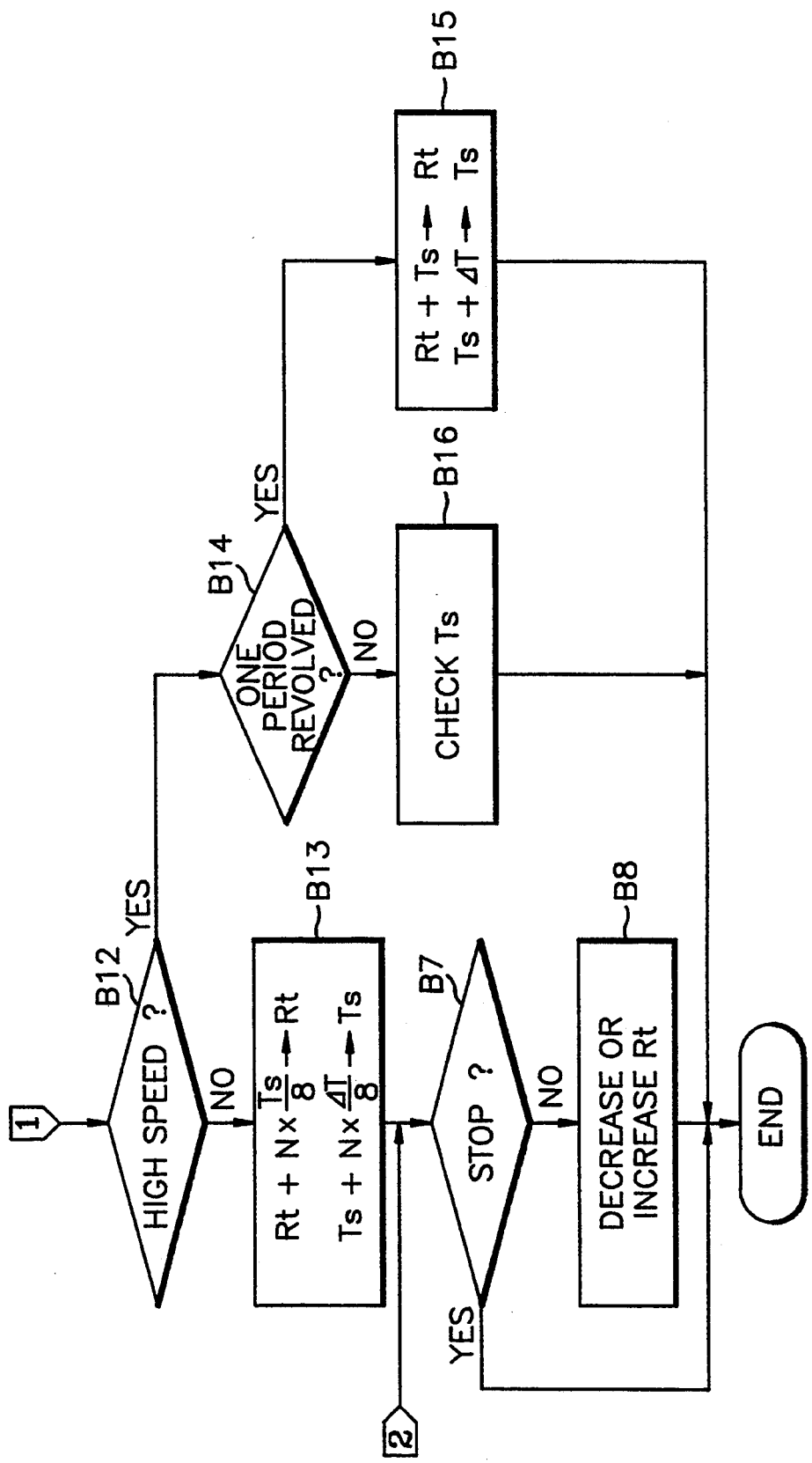

A method for measuring the remaining time according to the flowchart shown in FIG. 3A and 3B is stored and implemented as a program by the microcomputer 20. The method for measuring the remaining time of tape recorder according to the present invention will be described in detail hereinafter.

As the actual running speed of tape varies depending on wound amounts of tape even if a reel is given a turn at a uniform speed of reel motor in the high speed running mode of tape recorder, the remaining time must be calculated by physical measurement. Thus, the remaining time is calculated by measuring first the period($T_s$) of reel pulse on the part of supply reel and, in the following period after the tape is unwound by one rotation, a difference of $\Delta T$ as shown from the following formula (2) is uniformly made to the previous period.

$$\Delta T = |T_{so} - T_{s1}| = [2\pi r_{so} - 2\pi r_{s1}]/V_t \qquad (2)$$
$$= 2\pi(r_{so} - r_{s1})/V_t$$
$$= 2\pi\delta/V_t$$

wherein, $T_{so}$: The first period of the supply reel $T_{s1}$: The period of the supply reel after the tape is unwound by one rotation $r_{so}$: The first radius of the tape on the part of the supply reel $r_{s1}$: The radius of the tape on the part of the supply reel after the tape is unwound by one rotation $\delta$: Thickness of the tape $V_t$: Running speed of the tape As n reel pulses are generated invariably per one rotation period from the part of supply reel at this instance, the microcomputer 20 counts the sensed reel pulses and renders $R_t$(remaining time)=$R_t - T_s$; $T_s = T_s - \Delta T$, every time one period passes away. When the number of reel pulses does not amount to n at a standstill, a value $T_s/n$ is found and ($T_s/n$) is subtracted from the remaining time($R_t$) multiplied by the value counted in the meantime.

Figure 1A:
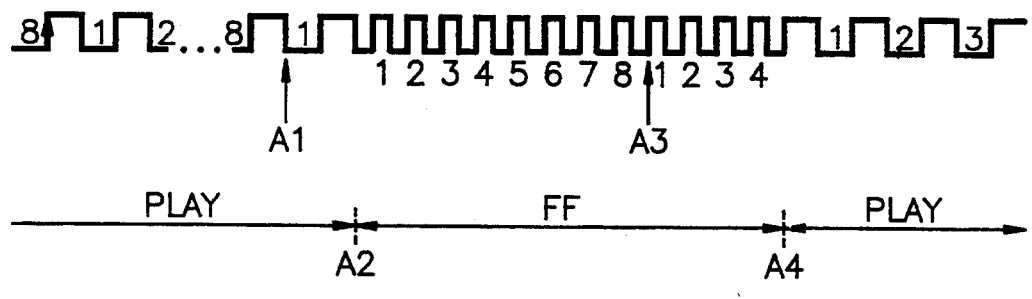
FIGS. 1A and 1B are an illustrative view taken to describe a variation of reel pulses caused by a variation of tape speed.
Figure 1B:
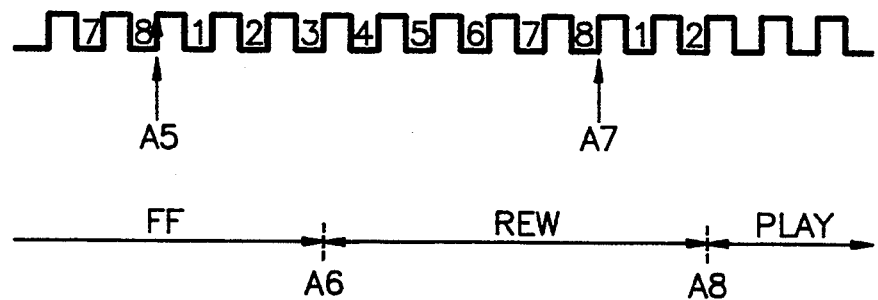

Assuming that 8 reel pulses are generated per period by referring to FIGS. 1A and 1B, in A1, a time $T_s$ newly measured is made the present period of the reel, in A2, $R_t$ is reduced as continuing time up to A2, in A3, $R_t$=(last $R_t$)$-T_s$ and $T_s$=(last $T_s$)$-\Delta T$ are made, in A4, $R_t$ attains to ($R_t$ in A3)$-4 \times (T_s/8)$ and $T_s$ attains to ($T_s$ in A3)$-4 \times (\Delta T/8)$ by reason that the period was given only a half turn and, in a playing condition, $R_t$ is reduced second by second.

In the event of high speed faster than 200-times speed, time is reduced at once to the extent of $T_s$ time, but it is not felt as unusual to the naked eyes as the reduced time is too short.

Referring to A5, it is same as A3. Referring to A6, it is same as A2 too. In the timing of A7, one period is wound in a reverse direction and so, the remaining time $R_t$) attains to (last $R_t$)$+T_s$, and $T_s$ attains to (last $T_s$)$+\Delta T$, which is reverse to A3.

In A8, $R_t$ attains to ($R_t$ in A7)$+2 \times (T_s/8)$, and $T_s$ attains to ($T_s$ in A7)$+2 \times (\Delta T/8)$.

In the following play, time is reduced second by second.

The method for correctly displaying the remaining time of tape according to the present invention even when the tape runs at a high speed or the speed of tape changes in the tape recorder, is executed as described hereunder. Here, we assume that 8 pulses are generated in one rotation period of the supply reel.

Referring to FIG. 3A, the microcomputer 20 judges first whether the present remaining time is calculated in the (B1) stage or not. When the existing remaining time is not calculated, remaining time must be found by physical formula by calculating the period $T_s$ on the part of a first supply reel. In order to measure the correct $T_s$, remaining time must be measured when placed certainly at the normal speed, i.e., play mode. Thus, the microcomputer 20 proceeds to the (B2) stage and judges whether the tape is playing. If the present condition is not playing, the microcomputer 20 terminates measuring of the remaining time. If the present condition is playing, then the microcomputer 20 measures in the (B3) stage every infinitesimal time until 8 reel pulses are generated. Based on this $T_s$, the microprocessor 20 calculates the remaining time $R_t$ according to physical algorithm and terminates a process of control. In the case where the remaining time calculation is completed in the said (B1) stage, the microcomputer 20 proceeds to the (B4) stage and judges whether the direction to which the tape runs is forward or reverse.

Thereafter, if forward, the microcomputer 20 checks in the (B5) stage whether the tape is in the forward directional high speed mode. The high speed mode means the mode in which the running speed of tape is not uniformly controlled by the capstan motor but the tape is made to turn round at a high speed by the reel motor. Consequently, when the tape is shifted to the normal speed mode driven by the capstan motor or to the stop mode after tape ran in the high speed mode in the (B5) stage, if high speed running has not passed beyond one period until then, the amount advanced that much must be subtracted in terms of time. At this time, 8 reel pulses are generated from the part of the supply reel during one period. Every time one reel pulse is generated, the microcomputer increases the counting value N. When the tape is shifted to the normal speed mode, the microcomputer 20 multiplies in the (B6) stage the counting value N accumulated until then by a value ($T_s/8$) fixed as the time per pulse. Then, if it subtracts the multiplied value from the remaining time $R_t$ remained until before that time $R_t$, the result thereof attains to the remaining time in relevant condition. The period $T_s$ in such a condition also attains to the present period $T_s$ when the value N of the counter accumulated is multiplied by ($\Delta T/8$) and subtracted from the preceding period $T_s$.

Thereafter, FIG. 3B, the microcomputer 20 judges in the (B7) stage whether the time the tape got out of the high speed mode signifies stop of the tape or signifies that the tape is shifted to a normal speed. In the case where the tape is shifted to a normal speed, the microcomputer 20 proceeds to the (B8) stage and increases or decreases the remaining time. In other words, in the event of normal speed mode, the tape uniformly proceeds at $V_t = 8.15$ m/s on the basis of playing condition and so the remaining time is reduced every second by the microcomputer 20. Also, in the case of medium speed like threefold and ninefold speed, the tape is made to proceed at $3 \times 8.15$ m/s and at $9 \times 8.15$ m/s by the capstan motor and so, in the case of threefold speed, one second is increased or decreased every 0.333 second depending on a running direction of the tape by the microcomputer 20. In the case of ninefold speed, one second is decreased or increased every 0.111 second.

However, when the tape is keeping the high speed mode in the (B5) stage, the microcomputer 20 proceeds to the (B9) stage. When the tape runs at a high speed, a running speed of tape is not uniform and so the microcomputer 20 judges whether the pulses counted amounts to 8 in number in order to subtract the time that the present tape takes to unwind one round, namely, $T_s$, from the present remaining time after one period. In case the reel pulses are not made to one period in the (B9) stage at that time, the microcomputer 20 increases in the (B10) stage the counting value one by one when reel pulses are reversed (become low) and records in the rising edge that one period is advanced when 8 reel pulses are counted. In case one period is advanced under high speed mode conditions in the (B9) stage, in the (B11) stage the microcomputer 20 deducts the one period time $T_s$ from the remaining time $R_t$ to attain the present remaining time $R_t$, and $\Delta T$ is deducted from the period $T_s$ to attain a new period $T_s$ as the period is reduced to the extent of $\Delta T$ because one period is advanced.

In case the tape is driven in a reverse direction in the (B4) stage, the microcomputer 20 checks in the (B12) stage whether the tape is in the high speed mode or not.

In case the tape is shifted to the normal speed mode or to the stop mode from the high speed mode at this time, the present remaining time $R_t$ can be found by multiplying the counting value N counted until then by the value $T_s/8$ time per pulse, and adding the multiplied value to the remaining time $R_t$ until before that time in the (B13) stage. The present rotation period $T_s$ can be found by multiplying the counting value N counted up to now by $\Delta T/8$ and adding the multiplied value to the preceding rotation period Ts.

When the remaining time $R_t$ and rotation period $T_s$ are found in such a manner as described hereinabove, the microcomputer 20 proceeds to the (B7) stage discussed above. However, in case the tape is under the high speed mode in the (B12) stage, the microcomputer 20 checks in the (B14) stage whether the reel pulse made one periodic rotation. In case one periodic rotation was not made, the microcomputer 20 proceeds to the (B16) stage and performs the same operation as the (B10) stage. If the microcomputer 20 is ascertained that the reel pulse has made one periodic rotation in the (B14) stage, the present remaining time $R_t$ is calculated in the (B15) stage by adding the corresponding period time $T_s$ to the previous remaining time $R_t$, ($R_t+T_s$), and the period rotation period $T_s$ is also increased to the extent of $\Delta T$, that is, ($T_s+\Delta T$), to attain the present rotation period $T_s$, as progress was made to the extent of one period.

As described hereinbefore, the method for measuring the remaining time according to the present invention has the advantage of being able to correctly measure the remaining time of tape even when the tape runs in the normal speed mode or in the high speed mode, or speed is changed or the direction of drive is shifted in the tape recorder.

What is claimed is:

1. A method for determining remaining time of a tape when said tape runs in a tape recorder having a supply reel and a microcomputer, said method comprising the steps of:
   (a) determining whether a present remaining time has been determined by said microcomputer;
   (b) counting, in response to a first result of the determination made in step (a), pulses generated in response to the rotation of said supply reel in a first running mode to determine a first value for a rotation period of said supply reel after a predetermined number of pulses have been counted;
   (c) determining said remaining time in response to the determination of said first value for a rotation period of said supply reel of step (b);
   (d) determining, in response to a second result of the determination made in step (a), a new value for every one new rotation period of said supply reel by reducing a previous value of a just previous rotation period of said supply reel by a predetermined change value according to a first running direction of said tape in said tape recorder after every one rotation period of said supply reel during a second running mode;
   (e) determining, after step (d), a new remaining time based on said first running direction of said tape by performing one of the steps of:
      (aa) decreasing said present remaining time by an amount corresponding to said new value every time said supply reel makes one periodic rotation; and
      (bb) increasing said present remaining time by an amount corresponding to said new value every time said supply reel makes one periodic rotation; and thereafter
   (f) recording said new remaining time as said present remaining time.

2. The method as claimed in claim 1, wherein step (aa) is performed when said first running direction is a forward running direction, and step (bb) is performed when said first running direction is a reverse running direction.

3. The method as claimed in claim 1, wherein said first running mode is a play mode and said second running mode is one of a high speed running mode or a speed-changed running mode.

4. The method as claimed in claim 3, wherein step (aa) is performed when said first running direction is a forward running direction, and step (bb) is performed when said first running direction is a reverse running direction.

5. The method as claimed in claim 1, further comprising a step of determining whether said tape is framing in said first running mode prior to performing step (b) when the first result of the determination made in step (a) indicates that no present remaining time has been determined by said microcomputer.

6. The method as claimed in claim 1, further comprising the steps of:
   determining whether said tape is running in said first running direction when said result of the determination made in step (a) indicates that a present remaining time has been determined by said microcomputer; and thereafter
   determining whether said tape is running in said second running mode prior to performing step (d).

7. The method as claimed in claim 6, wherein said second running mode is a high speed running mode, step (aa) is performed when said first running direction is a forward running direction, and step (bb) is performed when said first running direction is a reverse running direction.

8. The method as claimed in claim 1, further comprising the steps of:
   counting said pulses generated in response to the rotation of said supply reel while said tape is running in said first ruing direction in said second running mode;
   determining a counted value when said second running mode is changed to a third running mode;
   multiplying said counted value times a normal period for one rotation of said supply reel and dividing the result thereof by the number of pulses normally generated during said normal period to attain a changed rotation period value;
   multiplying said counted value times said change value and dividing the result thereof by the number of pulses normally generated during said normal period to attain a new change value;
   determining the new remaining time by performing one of the steps of:
      (cc) decreasing said present remaining time by said changed rotation period value; and
      (dd) increasing said present remaining time by said changed rotation period value; and
   determining a new rotation period of said supply reel by performing one of the steps of:
      (ee) decreasing a present rotation period by said new change value; and (ff) increasing said present rotation period by said new change value.

9. The method as claimed in claim 8, wherein steps (cc) and (ee) are performed if said first running direction is a forward running direction, and steps (dd) and (ff) are performed if said first running direction is a reverse running direction.

10. The method as claimed in claim 8, wherein said second running mode is a high speed running mode.

11. The method as claimed in claim 10, wherein steps (cc) and (ee) are performed if said first running direction is forward running direction, and steps (dd) and (ff) are performed if said first running direction is a reverse running direction.

12. A method for measuring remaining time of a tape running in a tape recorder having a supply reel, said method comprising the steps of:

determining whether a present remaining time has been recorded;

determining whether said tape recorder is in a play mode if said present remaining time has not been recorded;

counting pulses generated in response to the rotation of said supply reel and determining the duration of a rotation period when a predetermined number of said pulses have been counted;

generating a remaining time in response to said determined rotation period and recording said remaining time as said present remaining time;

determining whether said tape is running in a forward direction if said present remaining time has been determined to have been recorded;

determining whether said tape is running at a high speed;

determining a change in rotation period of said supply reel after a complete rotation of said supply reel;

determining a new rotation period of said supply reel by reducing a previous rotation period in response to said change in rotation period if said tape is determined to be running in said forward direction and at said high speed;

determining a new remaining time by reducing said present remaining time in response to said new rotation period; and recording said new remaining time as said present remaining time.

13. The method as claimed in claim 12, further comprising the steps of:

determining a new rotation period of said supply reel by increasing a previous rotation period in response to said change in rotation period if said tape is determined to be running in a reverse direction and if said tape is determined to be running at said high speed;

determining a new remaining time by increasing said present remaining time in response to said new rotation period; and recording said new remaining time as said present remaining time.

* * * * *

UNITED STATES PATENT AND TRADEMARK OFFICE
CERTIFICATE OF CORRECTION

PATENT NO. : 5,375,025
DATED : December 20, 1994
INVENTOR(S) : Chang-Nam Joo

It is certified that error appears in the above-indentified patent and that said Letters Patent is hereby corrected as shown below:

Column 3,

Line 35,    after "A2", delete "too",

Column 5,

Line 25,    before "rotation", delete "period",

UNITED STATES PATENT AND TRADEMARK OFFICE
CERTIFICATE OF CORRECTION

PATENT NO. : 5,375,025

DATED : December 20, 1994

INVENTOR(S) : Chang-NAM Joo

It is certified that error appears in the above-indentified patent and that said Letters Patent is hereby corrected as shown below:

IN THE CLAIMS

Column 6,

Line 22,     after "is", change "framing" to --running--,

Column 6,

Line 46,     after "first", change "ruing" to --running--:

Signed and Sealed this

Twenty-eighth Day of May, 1996

*Attest:*

BRUCE LEHMAN

*Attesting Officer*      *Commissioner of Patents and Trademarks*